J. GIBSON.
RESILIENT WHEEL.
APPLICATION FILED FEB. 12, 1916.
1,230,699.
Patented June 19, 1917.
2 SHEETS—SHEET 1.
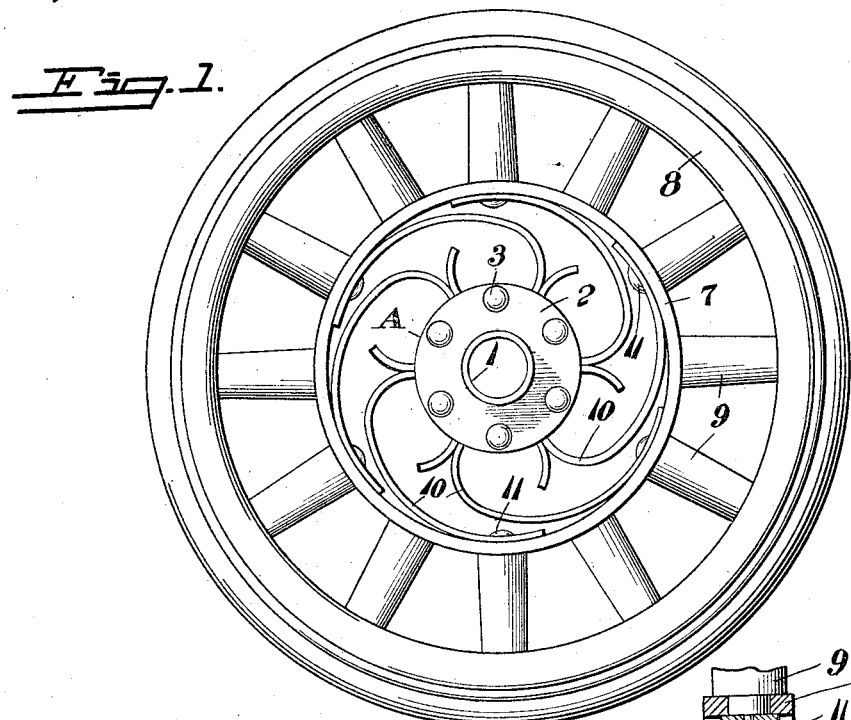
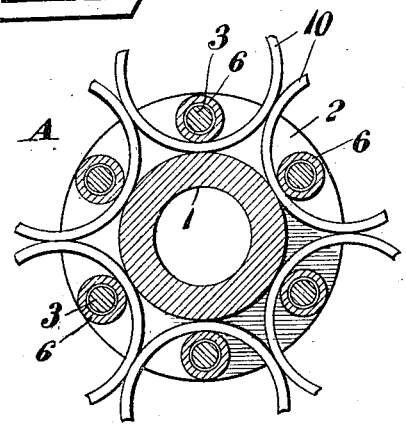
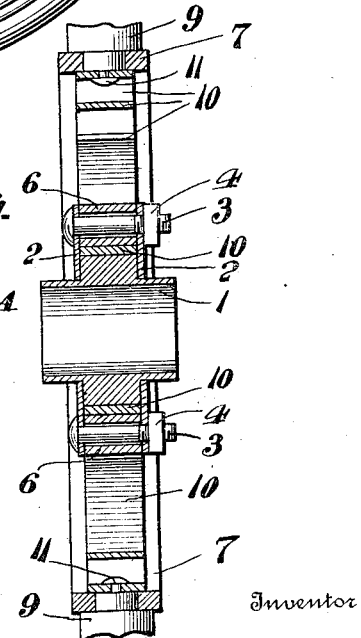
Inventor
John Gibson
By Victor J. Evans
Attorney
Witnesses
John D. Spalding
P. M. Smith J. GIBSON.
RESILIENT WHEEL.
APPLICATION FILED FEB. 12, 1916.
1,230,699.
Patented June 19, 1917.
2 SHEETS—SHEET 2.
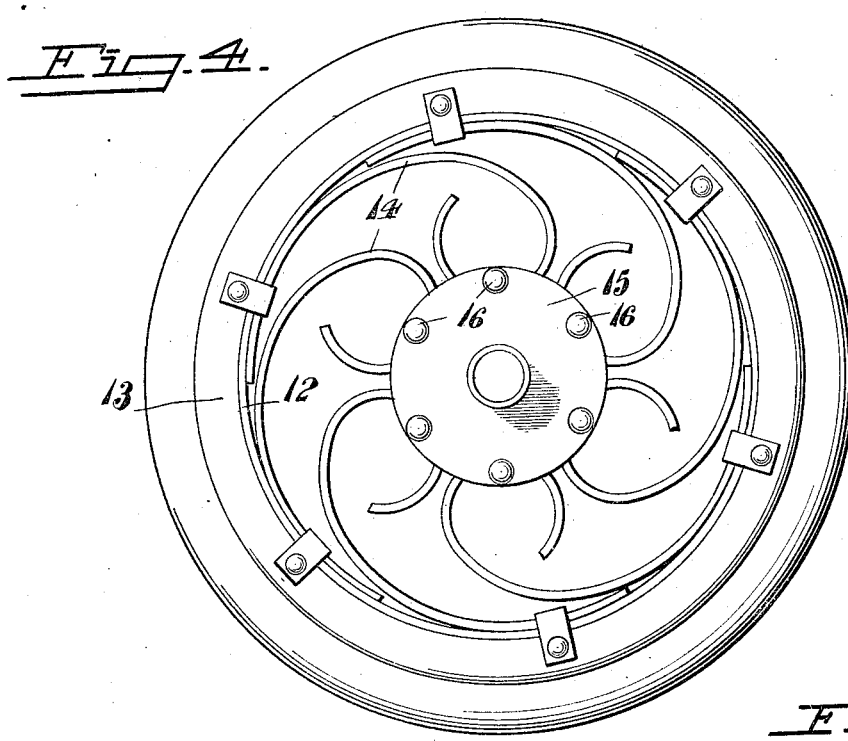
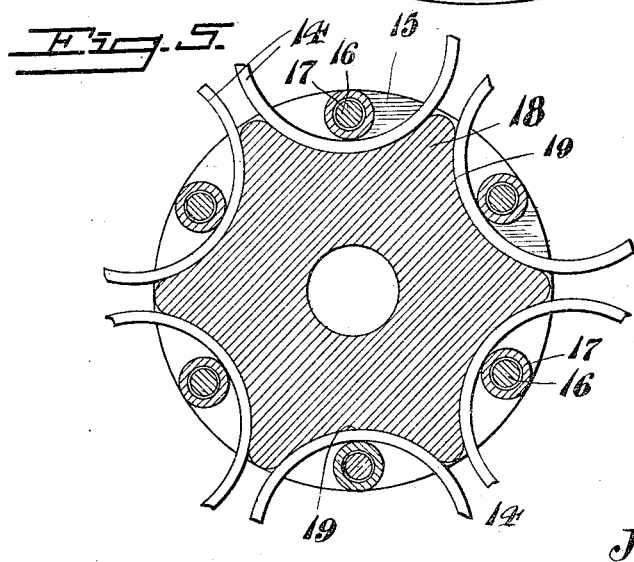
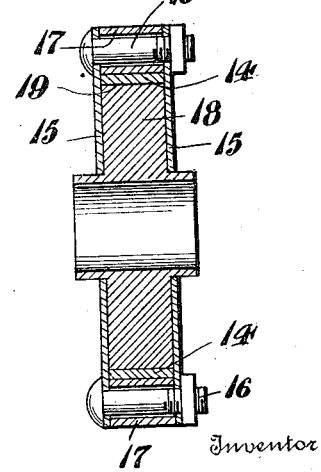
Witnesses
John D. Spalding
P. M. Smith
Inventor
John Gibson
By Victor J. Evans
Attorney

UNITED STATES PATENT OFFICE.

JOHN GIBSON, OF COURTENAY, NORTH DAKOTA.

RESILIENT WHEEL.

1,230,699.  Specification of Letters Patent.  Patented June 19, 1917.

Application filed February 12, 1916. Serial No. 77,925.

*To all whom it may concern:*

Be it known that I, JOHN GIBSON, a citizen of the United States, residing at Courtenay, in the county of Stutsman and State of North Dakota, have invented new and useful Improvements in Resilient Wheels, of which the following is a specification.

This invention relates to resilient wheels, the object in view being to provide a wheel which combines in connection with a hub, an annulus surrounding the hub and normally concentric therewith, which annulus may, under one form of the invention, constitute the outer rim or tire carrying felly of the wheel, and springs interposed between the hub and annulus and of novel formation and coöperative relation to each other and the wheel hub, whereby all ordinary road shocks and jars are absorbed between the hub and felly of the wheel, enabling a solid tire of any description to be mounted upon the wheel, thereby doing away with the use of pneumatic tires and the troubles incident to the use of the same.

With the above and other objects in view, the invention consists in the novel construction, combination and arrangement of parts, as herein described, illustrated and claimed.

In the accompanying drawings:—

Figure 1 is a side elevation of a wheel embodying the present invention.

Fig. 2 is an enlarged vertical longitudinal section through the hub.

Fig. 3 is a transverse section through the same.

Fig. 4 is a side elevation of a wheel embodying the same principle but dispensing with the use of spokes.

Fig. 5 is an enlarged longitudinal section through the same.

Fig. 6 is a transverse sectional view thereof.

Under the embodiment of this invention as illustrated in Figs. 1, 2 and 3, the hub of the wheel which is designated generally at A comprises an axle bearing member or skein 1, and a pair of substantially diskshaped side plates 2 which surround the hub and are secured thereto in any desired manner and which are arranged in spaced relation to each other.

Journal pins 3 extend through the hub plates 2 and are preferably in the form of bolts as shown, the said bolts being provided with nuts 4 which enable one or more of the bolts to be removed from the hub for the purpose of replacing a broken spring or roller as will hereinafter appear. Surrounding each of the journal pins is an anti-friction roller 6 which acts as a retainer for the inner end portion of one of the springs hereinafter described and serves to properly position and cushion the movement of such inner portion of the spring.

Encircling the hub is an annulus 7 which is of considerably greater diameter than the hub plates, and which under the arrangement shown in Fig. 1 forms what may be termed an inner or intermediate rim which lies between and normally concentric with the hub and the wheel felly 8, said annulus being connected to the felly by means of spokes 9 the extremities of which are fixedly connected to the annulus and the felly.

Interposed between the hub and annulus is a circular series of convolute springs. Each of said springs, indicated at 10, is of the single leaf type, although more leaves may be used where an extra heavy load is to be imposed on the wheel, and each spring is of gradually decreasing radius from the outer toward the inner extremity thereof. The outer end of each spring is connected by a fastener 11 to the annulus and the inner end portion thereof extends around one of the anti-friction rollers of the hub. Under the embodiment of the invention illustrated in Figs. 1, 2 and 3, the radii of the inner end portions of the spring are so proportioned that said inner end portions of the springs ride in contact with each other and thereby mutually support each other and collectively sustain and cushion the load imposed on the hub of the wheel. The width of the springs is such that the opposite side edges thereof ride in contact with the inner faces of the hub plates, thereby preventing excessive lateral thrust of the hub in relation to the annulus, at the same time cushioning and absorbing such end thrust of the axle so as to prevent the collapse of the wheel under excessive lateral strains.

Under the embodiment of the invention as illustrated in Figs. 4 to 6 inclusive, the annulus indicated at 12 is of such size as to bear against the inner face of the felly 13 of the wheel and in such case, no spokes are employed such as are shown in Fig. 1, the springs themselves taking the place of the spokes and being made correspondingly heavier for that purpose. The springs 14, the hub plates 15, the journal pins 16 and rollers 17 bear the same relation to each other and are of the same general construction and relative arrangement as described in connection with Figs. 1 to 3 inclusive except that the springs do not contact with each other. However, if desired, a star-shaped or scalloped spring supporting member 18 is interposed between the hub plates 15 and also acts as a spacing element for the hub plates. Said spring supporting member 18 is formed in the periphery thereof with concaved depressions or recesses 19 each of which forms an arcuate seat in contact with which the inner end portion of one of the springs is slidable, said end portion of the spring being confined between the supporting member 19 and the respective anti-friction and positioning roller.

It will also be seen that the springs mutually support each other and collectively sustain and cushion the load imposed on the hub. Any desired number of springs may be employed and they may be heavier or lighter according to requirements. Under the arrangement described, the wheel as a whole may be used either as a steering wheel or driving wheel for a motor propelled vehicle and where used as a propelling wheel, the springs, under the arrangement described, serve to absorb the stress brought upon the wheel when a motor vehicle is stopped or started suddenly. This adds not only to the durability of the wheel itself but to the life and durability of the motor vehicle as a whole.

Having thus described my invention, I claim:—

1. In a resilient wheel, a hub embodying a pair of substantially disk-shaped plates in spaced relation to each other, journal pins connecting said plates, rollers surrounding said pins and adapted to turn thereon, an annulus encircling the hub and normally concentric therewith, and a circular series of springs each of convolute formation and gradually decreasing in radius from the annulus to the hub, said springs being fastened at their outer ends to the annulus and having their inner portions slidable between the hub plates and also slidable between the body of the hub and the respective rollers.

2. In a resilient wheel, a hub embodying a pair of substantially disk-shaped plates in spaced relation to each other, journal pins connecting said plates, rollers surrounding said pins and adapted to turn thereon, an annulus encircling the hub and normally concentric therewith, and a circular series of springs each of convolute formation and gradually decreasing in radius from the annulus to the hub, said springs being fastened at their outer ends to the annulus and having their inner portions slidable between the hub plates and also slidable between the body of the hub and the respective rollers, the inner portions of the springs being so cooperatively related as to mutually support each other and collectively sustain and cushion the load imposed on the hub.

In testimony whereof I affix my signature in presence of two witnesses.

JOHN GIBSON.

Witnesses:
EDNA ROBINSON,
L. L. PANGBURN.

Copies of this patent may be obtained for five cents each, by addressing the "Commissioner of Patents, Washington, D. C."